(12) United States Patent
Peisl et al.

(10) Patent No.: US 7,627,248 B2
(45) Date of Patent: Dec. 1, 2009

(54) METHOD FOR PRE-EMPHASIS OF OPTICAL SIGNALS IN A TRANSMISSION SYSTEM COMPRISING ADD-DROP-MODULES

(75) Inventors: Wolfgang Peisl, München (DE); Lutz Rapp, Deisenhofen (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 571 days.

(21) Appl. No.: 10/562,304

(22) PCT Filed: May 3, 2004

(86) PCT No.: PCT/EP2004/050680

§ 371 (c)(1), (2), (4) Date: Dec. 22, 2005

(87) PCT Pub. No.: WO2004/114567

PCT Pub. Date: Dec. 29, 2004

(65) Prior Publication Data

US 2006/0159450 A1      Jul. 20, 2006

(30) Foreign Application Priority Data

Jun. 25, 2003    (DE) ................................ 103 28 602

(51) Int. Cl.
H04J 14/02      (2006.01)
H04B 10/08     (2006.01)

(52) U.S. Cl. .............................. 398/94; 398/38; 398/59; 398/60; 398/70; 398/83; 398/91

(58) Field of Classification Search .................... 398/38, 398/59, 60, 70, 83, 91, 94; 359/337, 337.1, 359/337.13
See application file for complete search history.

(56) References Cited

U.S. PATENT DOCUMENTS

2001/0048687 A1* 12/2001 Coden ........................ 370/403

(Continued)

FOREIGN PATENT DOCUMENTS

DE         100 24 393 A1     11/2001

(Continued)

OTHER PUBLICATIONS

A.R. Chraplyvy, J.A. Nagel and R.W. Tkach, "Equalization in Amplified WDM Lightwave Transmission Systems", IEEE Photonics Technology Letters, Aug. 1992, pp. 920-922, vol. 4, No. 8.

*Primary Examiner*—Ken N Vanderpuye
*Assistant Examiner*—Daniel G Dobson
(74) *Attorney, Agent, or Firm*—Dickinson Wright PLL

(57) ABSTRACT

A method for pre-emphasising transmitted signals in channels for multiplex signals along a transmission path comprising supply and/or branch points is provided. According to the method, relative degradations of the signal-to-noise intervals between transmitted signals via any category or group of channels—i.e. express and add or drop channels or add-drop channels are taken into account. A point-to-point link and for transparent optical networks may be used. To this end, the average signal powers of different channel groups are set relative to one another in order to obtain predetermined signal-to-noise intervals for each group. In addition, the signal-to-noise intervals within a channel group are equalized at their termination points. Regulation protocols for controlling the pre-emphasising steps are provided.

22 Claims, 3 Drawing Sheets

U.S. PATENT DOCUMENTS

| | | | |
|---|---|---|---|
| 2002/0015199 A1* | 2/2002 | Eder et al. | 359/110 |
| 2002/0024723 A1* | 2/2002 | Sekiya et al. | 359/337.1 |
| 2002/0154359 A1 | 10/2002 | Tsuda et al. | |
| 2006/0098990 A1* | 5/2006 | Claringburn | 398/193 |

FOREIGN PATENT DOCUMENTS

| | | |
|---|---|---|
| EP | 0 959 578 A2 | 11/1999 |
| WO | WO 99/14897 | 3/1999 |

* cited by examiner

METHOD FOR PRE-EMPHASIS OF OPTICAL SIGNALS IN A TRANSMISSION SYSTEM COMPRISING ADD-DROP-MODULES

CROSS REFERENCE TO RELATED APPLICATIONS

This application is the US National Stage of International Application No. PCT/EP2004/050680, filed May 3, 2004 and claims the benefit thereof. The International Application claims the benefits of German application No. 10328602.0 DE filed Jun. 25, 2003, both of the applications are incorporated by reference herein in their entirety.

FIELD OF INVENTION

The invention relates to a method for pre-emphasis of optical signals in a transmission system with add-drop-modules.

BACKGROUND OF INVENTION

Optical amplifiers for a multiplex signal to be transmitted with channels featuring a number of different wavelengths exhibit a wavelength dependency on gain which is not completely rectified by smoothing filters normally employed. This means that performance differences between individual-channels accumulate as they pass through an optical transmission link. Furthermore the noise figure of these optical amplifiers is also wavelength-dependent. This means that the channels possess greatly differing Optical Signal-to-Noise Ratios (OSNR) at the relevant receivers of the transmission link. In point-to-point connections a method frequently known under the name of "pre-emphasis" for equalizing the values of the signal-to-noise ratios is used, which has been described in A. R. Chraplyvy, J. A. Nagel and R. W. Tkach, "Equalization in Amplifier WDM Lightwave Transmission Systems", IEEE Photonics Technology Letters, Vol. 4, No. 8, 1992, pp. 920-922. In this method, on the basis of the distribution of the signal-to-noise ratios measured at the end of the transmission link the send-side signal powers of the channels are adjusted in an iterative method until such time as the same signal-to-noise ratios are produced at the end of the transmission link for all channels. An important feature In this case is that the signal powers of all channels can be set at one location.

For long transmission links it can no longer be sufficient under some circumstances to only equalize the signal powers of the channels at the start of the link. Special adjustable filters (DGE=Dynamic Gain Equalizer) have thus been developed which make it possible to equalize the powers in the middle of the link. The same task can also be handled with an add-drop module (OADM=Optical Add/Drop Multiplexer) in which complete demultiplexing on individual channels is undertaken. It is generally assumed that an optimum signal quality at the end of the transmission link is produced if at the end of a link section identical signal-to-noise values are obtained for all channels. Link section here is to be seen as the part of a optical transmission link preferably from the transmitter to the first add-drop module OADM, from an add-drop module OADM to the next add-drop module OADM or from an add-drop module OADM to the demultiplexer with the downstream receivers.

For reasons of cost however it is frequently not sensible to undertake complete demultiplexing down to individual channels; Instead entire bands of channels are looped through by an add-drop module OADM. In this case there is then no opportunity for setting the powers of the channels individually at the location of the OADM, as would be prescribed in a usual method for pre-emphasis.

To provide a better understanding of the problem a simple case is examined below. In the network depicted in FIG. 1 a first e.g. red subband of express channels EK is transmitted from the start Tx of the transmission link LWL to its end Rx, while a second e.g. blue subband of add channels AK—e.g. with smaller wavelengths than in the red subband—is coupled into an add-drop module OADM arranged in the transmission link. The red subband would be looped through in the add-drop module OADM. Regenerators OV1, 0V2 are provided along the transmission link LWL for regeneration of the signals.

Since it is not possible to adjust the power in the add-drop module OADM the initial obvious option is to perform a separate pre-emphasis P1, P2 for the two subbands. And to do this for the blue subband from the add-drop module OADM to the receiver Rx and for the red subband from the transmitter Tx to the receiver Rx. However the problem which arises in this case is that the noise figure of an optical amplifier at long wavelengths (red) can be for example 2 dB greater than that at a short wavelengths (blue). When an average channel power per subband is kept constant the red subband exhibits a far worse performance than the blue subband. This type of method for the individual channel power equalization is described in DE 100 24 393 A1, in which the signal level of express channels, add channels, drop channels or add-drop channels is equalized individually with the aid of a controllable attenuation element at the transmitter or in an add-drop module. In this case a pre-emphasis is initially performed for the express channels. Subsequently the signal level of the at least one optical add-drop signal is equalized with the power spectrum of the express channels determined by means of an intra- or extrapolation. This means that an add-drop signal is inserted in the optimum way as regards the amplitude and the phase into the power spectrum of the express channels determined, however not with respect to performance through noise figure effects.

In FIG. 2 a further problem is looked at preferably for fully-optical networks which also has effects on the method previously described in FIG. 1. express channels EK as red subband are transmitted from a transmitter Tx to a first receiver Rx1 along a transmission link. Two add-drop modules OADM 1, OADM2 are integrated into the transmission link. At the transmitter Tx drop channels DK are injected as blue subband into the transmission link LWL and at the second add-drop module OADM2 dropped from the transmission link LWL and routed to a second receiver Rx2. Regenerators OV are provided for the transmission link LWL.

Both at least one signal of the red subband and also at least one signal of the blue subband are injected at the same location into the network. As part of a pre-emphasis an identical value of the optical signal-to-noise ratio OSNR is forced at the second add-drop module OADM2 for both signals. This does not take account of the fact that signals in the blue subband have covered a much shorter distance after passing the second add-drop module OADM2 than signals in the red subband. express channels EK will thus exhibit a far worse optical signal-to-noise ratio OSNR at the first receiver Rx1 assigned to them than signals in drop channels DK at the second receiver Rx2.

A method is known from EP 0 959 578 A2 for pre-emphasis for a WDM multiplex signal transmitted over a transmission link with add and drop points. At the end of the transmission link a computer will control all pre-emphasis steps centrally, so that absolute signal-to-noise ratios of the signals at receivers connected at the add and drop points of the transmission link are as identical as possible. Relatively different deteriorations of the signal-to-noise ratios e.g. between any given signals transmitted in express channels and in add-drop channels are not taken into account here.

SUMMARY OF INVENTION

An object of the invention is to specify a method for pre-emphasis of signals in a transmission link with add and/or drop points, in which relative deteriorations of the signal-to-noise ratios e.g. between transmitted signals over any given categories of channels (express, add, drop, add-drop) are to be taken into account. The method is also to be suitable for a point-to-point connection.

Taking the prior art shown in FIG. 1 as its starting point, in which a separate pre-emphasis is performed for each subband and for which the average channel power per subband is kept constant, the red subband exhibits a far worse performance at the receiver than is actually possible. If all channels at the add-drop module OADM were now to be coupled in, one could achieve identical signal-to-noise ratios for all channels at the receiver Rx, by in accordance with the invention reducing the average channel power in the blue subband add channels AK—in favor of the red subband—express channels EK.

An improvement can be obtained by initially calculating for all channels which are transmitted in the link the optimum power distribution at the OADM, i.e. a pre-emphasis calculation is undertaken for all channels for the route from the OADM to the end of the transmission link. For the blue subband this power distribution is set at the OADM. For the red subband on the other hand only the average power modification hypothetically produced by a pre-emphasis setting is calculated and with the aid of an attenuation element the average power in this subband modified accordingly. This means that it is again possible to reduce the average power of the blue subband in favor of the red subband, with the average power per channel remaining constant. A transmitter-side optimization of the power distribution within this subband is then undertaken.

With the configuration in FIG. 2 however an identical optical signal-to-noise ratio OSNR lying between the values of the signal-to-noise ratios for the two signals could be achieved at their relevant receivers Rx 1, Rx2 by making sure that signals in the red subband—express channels EK—exhibit a better optical signal-to-noise ratio OSNR at the output of the second add-drop module OADM2.

Thus the method described above could be modified such that the formula specified in the prior art for calculating the power distribution is modified such that identical values of the optical signal-to-noise ratios OSNR are no longer demanded, but instead a predetermined profile of them. This profile must be specified by a network planning tool which for this purpose best calculates a key value for the expected quality deterioration on the route section covered by the signals. This then takes account of the fact that a signal in a channel which will experience a stronger deterioration in a subsequent link section, must leave this section with a better signal-to-noise ratio by comparison with the other channels. In other words a relative SNR requirement is introduced. The key value can be determined from a rough estimate but also with more refined methods. These can also include non-linear fiber effects.

The Inventive method can be further refined in that, as well as the link characteristics, transmitter and receiver characteristics are also taken into account. Account is then taken for example of the fact that a signal without FEC (Forward Error Correction) needs a better optical signal-to-noise ratio OSNR than a signal transmitted in parallel which needs an FEC.

With all these variants a method can be used—but does not have to be—in which the direct ASE (Amplified Spontaneous Emission) overlaid onto the channel is measured. Under some circumstance a simple measurement of signal powers for determining the average signal power of a group of channels can suffice.

A significant advantage of the method in accordance with the invention can be seen in that this method is applicable to both optical networks and also to the limit case of a point-to-point connection contained in them since pre-emphasis steps can be controlled locally, i.e. at any section of a network.

In general and starting from a method for pre-emphasis of an optical wavelength multiplex division signal, of which the signals with different wavelengths are transmitted assembled into groups B1, B2, B3, B4 via express channels as well as over drop channels, add channels or add-drop channels of a transmission link LWL with a number of sections, in accordance with the invention a number of sub-pre-emphasis settings of the groups B1, B2, B3, B4 of signals are made at the injection points NEi, OADMj ($I \geq 1$, $j \geq 1$) of the sections of the transmission link LWL such that, to obtain predetermined average optical signal-to-noise ratios OSNR1, OSNR2, OSNR3, OSNR4 of the different groups B1, B2, B3, B4 of signals at their termination points, the average power of at least of one group B1, B2, B3, B4 of signals is reset at at least one injection point shared with the group B1 of the express channels.

This method can likewise be used for two or three groups B1, Bi ($I>1$) with express channels and other channels which are also partly transmitted along the transmission link LWL as in the previous FIG. 1 or 2. Furthermore the method in accordance with the invention is also suitable for any number 4, 5, 6, etc of groups of channels Bi ($I>1$).

At the injection point the average signal power of group with drop channels or add-drop channels dropped or terminated at a subsequent drop point is reduced in favor of the group of express channels transmitted onwards.

The signal powers are redistributed between the groups B1, B2, B3, B4 in the injecting or switching network elements NEi, OADMj by means of signal power regulation. Separate means can also be used for signal power regulation at these points.

To equalize the optical signal-to-noise ratios at a termination point of the groups B1, B2, B3, B4 of channels an additional individual-channel pre-emphasis is undertaken at its injection point. Methods in accordance with the prior art can be used for this.

The specification of average optical signal-to-noise ratios OSNR1, OSNR2, OSNR3, OSNR4 of the different groups B 1, B2, B3, B4 of signals at their termination points is defined by a network management element.

Two advantageous regulation protocols for executing the inventive method are described below, which can be used for preliminary calculation or for direct control of the sub-pre-emphasis settings—as well as of the required additional individual-channel pre-emphasis—by means of a data packet.

The data packet will be transmitted from and returned to an injection point over a number of sections up to a termination point of any given express channels of a network. The data packet features a counter and at least two markings of the pre-emphasis steps of groups to be set. The counter controls the transmission of the data packet and thereby the start and the end of the pre-emphasis steps. The markings serve to activate one or more sub-pre-emphasis setting of groups of channels as well as of one or more individual-channel pre-emphases of groups of channels A number of regulation protocols can be implemented depending on the type of encoding of the counter and/or the marking. However only two of these are explained in the present invention which allow a particularly rapid and simple execution of the method.

After the execution of the methods for a network section, i.e. locally between the injection point and the termination point of any given express channels, the data packet is forwarded to a further network section in which further pre-emphasis steps are controlled in accordance with the invention. The method is suitable for network sections with any number of sections with intermediate network elements such as regenerators, add-drop modules, filters etc.

Advantageous developments of the invention are specified in the dependent claims.

BRIEF DESCRIPTION OF THE DRAWINGS

An exemplary embodiment of the invention is explained in more detail below on the basis of the drawing.

The Figures show.

DETAILED DESCRIPTION OF INVENTION

Figure 1:
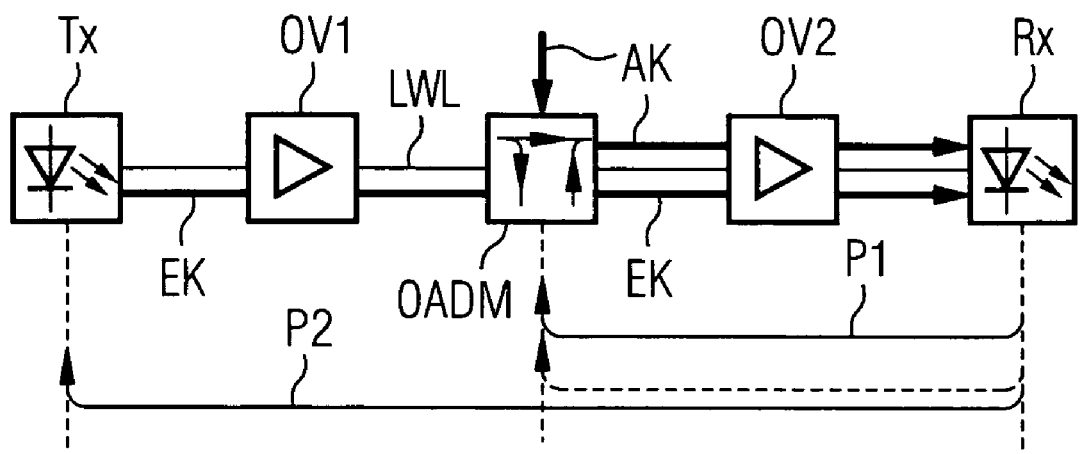
FIG. 1: a prior art communications network.
Figure 2:
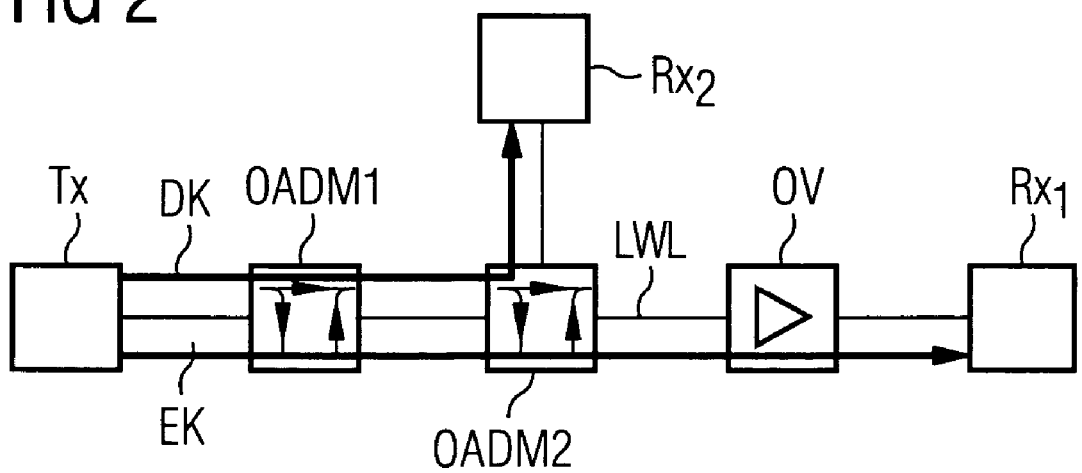
FIG. 2: a further prior art communications network.

The first regulation protocol is explained in greater detail below with further reference to the functional units of FIG. 3.

The counter has two functional aspects. On the one hand it signals with the value 0 to the receiving network element that the preceding pre-emphasis step is completed and that the receiving network element is to take over the control of the next step—sub-pre-emphasis setting and individual-channel pre-emphasis. On the other hand the counter accepts positive values 1, 2, 3, etc during a pre-emphasis step which enables subsequent network elements to be controlled by the controlling network element. These positive values 1, 2, 3, etc also indicate the number of sections through which the data packet still has to pass over which the data packet will be transmitted outwards over the transmission link LWL. For each section passed through the counter at the incoming network element is reduced by one until it reaches the value 1. At the network element there the data packet is routed section-by-section back to the original network element and its counter is likewise incremented at each network element again with 2, 3, etc. With this backwards transmission a marking for a group is activated in each case if this group is dropped in the network element, e.g. this group is terminated outside the transmission link LWL somewhere in an external network branch. At this drop point the average signal-to-noise ratios of the group involved with a drop channel are possibly reduced in favor of the average signal-to-noise ratio of the group with express channels such that the express channels are transmitted over a longer route than the drop channels in relation to the transmission link LWL.

For the return of the data packet and with active marking of a dropped group of signals, the marking of this group is however deactivated if the data packet runs back into a network element at which this group of signals was injected into the transmission link. If the data packet now arrives at the original network element and the marking of a group with drop or add or add-drop channels is still active, a sub-pre-emphasis setting is made at the original network element for this group and the group with express channels. An individual-channel pre-emphasis of the group with drop, add, or add-drop channels is also undertaken. With this first regulation protocol an individual-channel pre-emphasis of the group with express channels is also undertaken since the last network element of the transmission link as the termination point of the group of express channels invokes an activation of the marking in the data packet for this group and the data packet passes over the link to the transmitter without the marking of the express channels being cancelled.

If a network element receives a backwards-transmitted data packet for which the counter has changed compared to the original forwards-transmitted data packet, the counter will be set to the value 0. In this case the current network element as the starting point or control element for the forward transmission of the data packet is shifted to the next network element at which at least one group of signals is dropped from the transmission link LWL. The counter is again set to the value 1 there and the overall regulation protocol explained above can be executed again. The last step of the overall regulation protocol ends at the last section or sections of the transmission link LWL at which add channels are transmitted together with the express channels and subsequently terminated.

Figure 3:
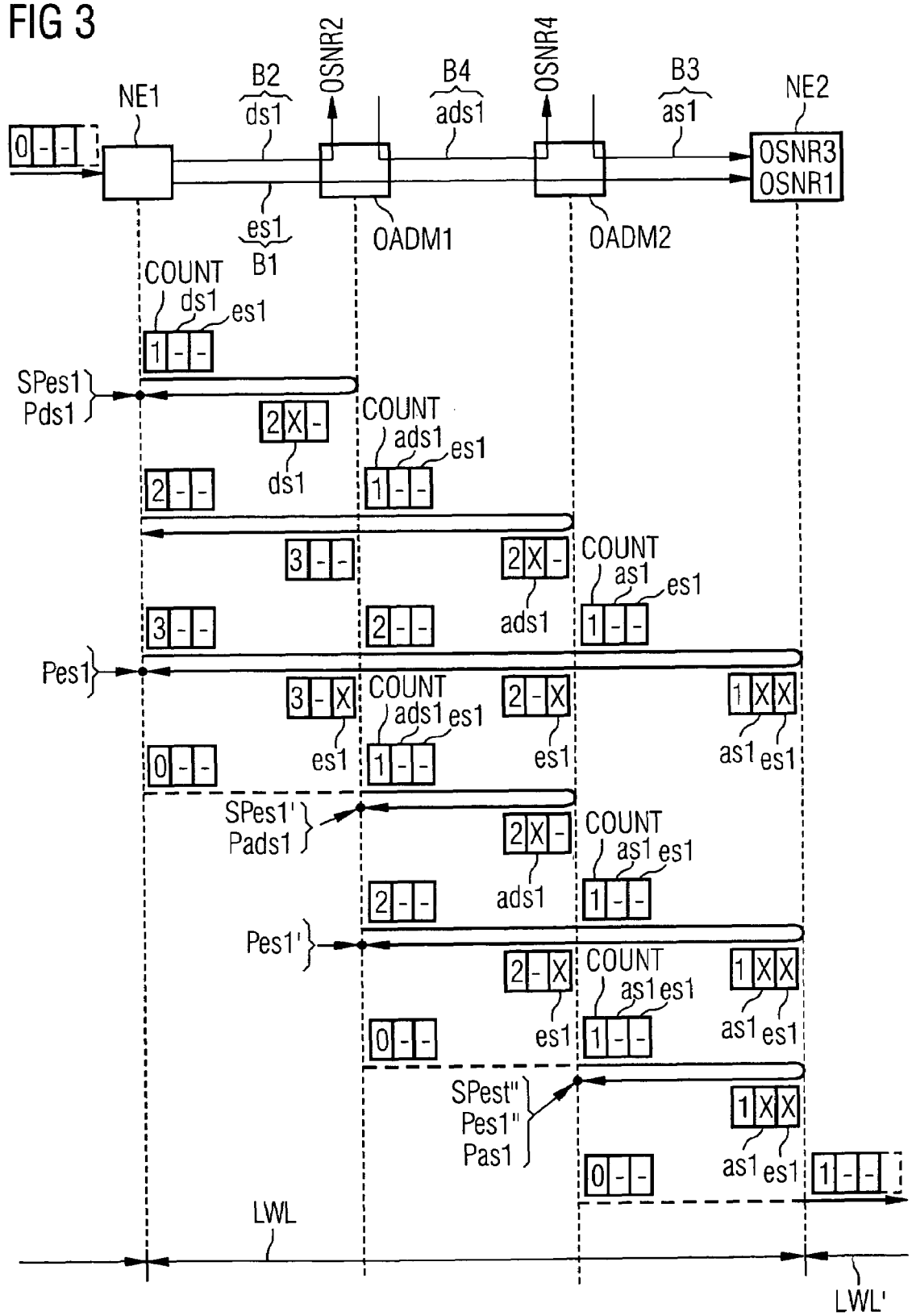
FIG. 3: a structure diagram for schematic representation of the first regulation protocol.

FIG. 3 shows the different steps of this first regulation protocol for four groups B1, B2, B4, B3 of signals, which are each transmitted via express channels es1 of a first network element NE1 to a second network element NE2, drop channels ds1 of the first network element NE1 to a first add-drop module OADM1, add-drop channels ads1 of the first add-drop module OADM1 to a second add-drop module OADM2 and add channels ad1 of the second add-drop module OADM2 to the second network element NE2.

At the first network element NE1 as the starting point the counter COUNT is set to the value 1—i.e. the data packet is transmitted over an individual section—and hereby the data packet is routed to the first add-drop module OADM1. Now the data packet is transmitted backwards and the counter COUNT is thus incremented to the value 2. Because of the dropping of the group B2 of the drop channels ds1 from the first add-drop module OADM1 the marking X of the group B2 of drop channels ds1 is activated and the data packet is fed back to the first network element NE1 where a first sub-pre-emphasis SPes1 for the groups B1 of the express channels es1—i.e. the average signal powers of the groups B1, B2 of the express channels es1 and of the drop channels ds1 are reset—as well as an individual-channel pre-emphasis Pds1 executed for the group B2 of drop channels ds1.

The data packet is again transmitted forwards with the counter at the value 2 over two sections NE1, OADM1, OADM2. In the second section OADM1, OADM2 via the first add-drop module OADM1 the value of the counter COUNT is set to 1. Now the data packet is transmitted backwards and the counter COUNT is thus incremented to the value 2. Because of the dropping of the group B4 of add-drop channels ads 1 from the second add-drop module OADM2 the marking X for the group B4 of add-drop channels ads1 is activated and the data packet only then fed back to the first add-drop module OADM1. At the first add-drop module OADM1 a pre-emphasis is performed for these channels and the corresponding marking X="−" deactivated. The counter COUNT is now further incremented to the value 3, so that, by comparison with the original counter COUNT=2 at the start of the outwards and return journey of the data packet over two sections, it has changed on arrival of the data packet at the first network element NE1. At the starting point of the pre-emphasis-step no markings are thus active and therefore no pre-emphasis of any type is performed.

A third outwards and return journey of the data packet now with a counter COUNT=3 at network element NE1 is initiated over the three sections NE1, OADM1, OADM2, NE2. Before the data packet returns from network element NE2 to the second add-drop module OADM2 two markings for the groups B1, B3 of the express channels es1 and of the add channels as1, which are terminated at network element NE2, are activated. In accordance with the previous step of the regulation protocol the marking X="−" is already deleted for the group B3 of add channels as1 at the add-drop module OADM2, but not the marking X for the group B1 of express channels es1. Because of the termination of the group B1 with express channels the counter is not incremented on return from the second network element NE2, i.e. COUNT=1. Thus an individual-channel pre-emphasis Pes1 of the group B1 of signals is performed on arrival of the data packet at the first network element NE1. The counter COUNT also has the value 3, which is identical to the original counter COUNT=3 at the start of the outward and return journeys of the data packet over the three sections. Therefore the counter is set to the value 0. This signals that the first network element has ended the pre-emphasis steps which it is to control. With this value a data packet is now sent to the first downstream OADM1, which as a result of the value 0 recognizes that it has to assume control of the next steps. The first add-drop module OADM1 now acts as the start point or control element for further steps of the regulation protocol and initiates further pre-emphasis-steps by sending a data packet with value 1 for the counter to the subsequent add-drop module OADM2. The subsequent steps are now controlled in a similar way to the method described above.

In other words the first network element NE1 is deactivated for further controlling and transmits the data packet to the first add-drop module OADM 1, where the counter COUNT is set to the value 1. The first add-drop module OADM1 now acts as a starting point for further steps of the regulation protocol.

The data packet is transmitted over an individual section from the first add-drop module OADM1 to the second add-drop module OADM2. Now the data packet is transmitted backwards and the counter COUNT is thus incremented to the value 2. Because of the dropping of the group B4 of add-drop channels ads1 from the second add-drop module OADM2 the marking X of the group B4 of add-drop channels ads1 is activated and the data packet is routed back to the first add-drop module OADM 1, where a second sub-pre-emphasis SPes1' for the group B1 of express channels es1—i.e. the average signal powers of the groups B1, B4 with express channels Es1 and add-drop channels ads1—as well as an individual-channel pre-emphasis Pads1 for the group B4 with add-drop channels ads1 are performed.

A new outwards and return journey of the data packet now follows over the two last sections OADM1, OADM2, NE2. Two markings X for both groups B1 terminated at the second network element NE2, B2 with the express channels es1 and the drop channels ds1 are activated. Because of the termination of the group B1 with express channels the counter is not incremented on return from the second network element NE2, i.e. COUNT=1. The marking for the group B2 with the drop channels ds1 is omitted when the data packet passes back though the first add-drop module OADM1, but not the marking for the group B1 with the express channels es1. Thus a new individual-channel pre-emphasis Pes1' of the group B1 of signals could be performed at the first add-drop module OADM1 if the first add-drop module OADM1 allows it.

Since the counter COUNT has the value 2, which is identical to the original error value COUNT=2 at the start of the outwards and return journeys of the data packet over the two last sections, the counter is set to the value 0.

Subsequently the data packet is sent to the second add-drop module OADM2 of which the counter is now 1 and, as a result of the termination of the group B1 with express channels is not incremented on return from the second network element NE2. Two markings X for the groups B1, B3 with express channels es1 and the add channels as1 are activated and on arrival at the second add-drop module OADM2 a third sub-pre-emphasis SPes1"—i.e. the average signal powers of the groups B1, B3 with express channels es1 and add channels as1—as well as an individual-channel pre-emphasis Pas1 for the group B3 with the add channels as1 are performed. The one individual-channel pre-emphasis Pes1" for the group B3 of express channels es1 could be performed here if the second add-drop module OADM2 es1 allows it.

The regulation protocol is ended if the second network element NE2 receives a data packet with counter COUNT=0 from the second add-drop module OADM2. If the network element NE2 terminating the network section is followed by a further network section, the receipt of a data packet with a counter COUNT=0 at the second network element NE2 can trigger the pre-emphasis of a further transmission link LWL'.

A further pre-emphasis, depending on the infrastructure of the network, could also start from a network element other than the second network element NE2.

It is pointed out here that in this case two markings for activating or deactivating the pre-emphasis KIPi, SPlj (I≧1, j>1) of the four groups are sufficient, since, for reasons of clarity in this first exemplary embodiment, the different drop or add or add-drop channels from the groups B2, B3, B4 of signals per section do not overlap. If the number of different channels transmitted per section increases, precisely as many markings in the data packet must be used.

Furthermore there can be further network elements or add-drop modules upstream or downstream from the first network element NE1 or the second network element NE2. The regulation protocol is independent of this because of the transmitted data packet for activating or deactivating an active network element at the beginning of the pre-emphasis steps.

Figure 4:
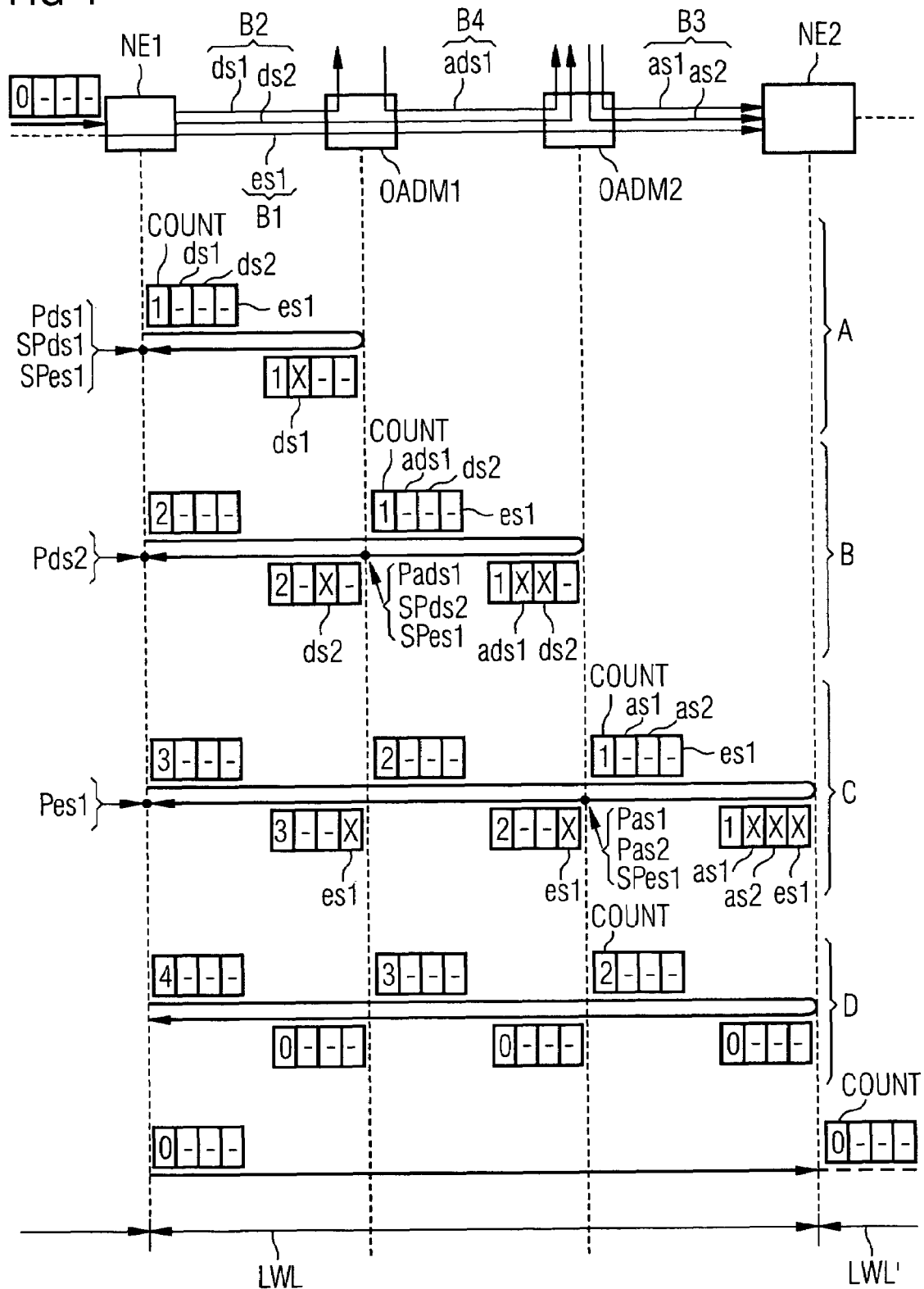
FIG. 4: a structure diagram for schematic representation of the second regulation protocol

FIG. 4 shows a second regulation protocol in which two additional transmitted groups B2, B3 of further drop channels ds2 are inserted between the first network element and the second add-drop module OADM2 and further add channels as2 between the second add-drop module OADM2 and the second network element NE2 in accordance with FIG. 3. Thus up to three categories of channels are transmitted per section. I.e. three markings are used in the data packet.

The main difference from the first regulation protocol lies in the fact that, on return of a data packet from a section end, e.g. from the second add-drop module OADM2, a sub-pre-emphasis setting SPes1, SPds2 for the express channels es1 and for the dropped, i.e. marked channels at this section end OADM2—here ads1 and ds2—is immediately performed at the section start—here at the first add-drop module OADM1. If other channels—here ads1—are added at the section start OADM 1, an individual-channel pre-emphasis Pads1 of these channels is also performed which likewise invokes an activation of the marking for this group of channels ads1 returning with the data packet. Further individual-channel pre-emphases—e.g. Pds2—of a group of channels—e.g. ds2—are performed at the add point shared with the express channels.

The counter COUNT of a data packet transmitted outwards and backwards is generally set identically as regards incrementation in accordance with FIG. 3. The value NULL only occurs if the pre-emphasis is completed for the entire network section, since all pre-emphasis steps for the corresponding network section are controlled by the network element at their start. After completion of the pre-emphasis the data packet with the value NULL is now forwarded over the three regulated sections for initialization of one or more further network sections LWL'.

With the second regulation protocol effectively only three outwards and return journeys of the data packet over one, two and three sections are needed in order to perform all sub-pre-emphases and individual-channel pre-emphases of the groups B1, B2, B3, B4 of signals in the channels es1, ds1, ds2, ads1, as1, as2. No pre-emphasis is performed with the fourth outwards and return journey or the fifth outward journey of the data packet.

In accordance with the second protocol regulation the summarized settings A, B, C, D as shown in FIG. 5 are thus executed step-by-step in this way:

A) For a counter COUNT=1 recovered in the first section NE1, OADM1 and a marking for the drop channels ds1 dropped in the first add-drop module OADM1 an individual-channel pre-emphasis Pds1 of the drop channels ds1 is performed in the first network element NE1, with two sub-pre-emphasis settings SPds2, SPes1 of the drop channels ds2 and of the express channels es1.

B) For a counter COUNT=1 recovered in the second section OADM1, OADM2 and a marking for the add-drop channels ads1 and drop channels ds2 dropped in the second add-drop module OADM2 an individual-channel pre-emphasis Pads1 of the add-drop channels ads1 with two sub-pre-emphasis settings SPds2, SPes1 of the drop-channels ds2 and of the express channels es1 is performed in the first add-drop module OADM1. Furthermore the counter in the returned data packet is set to 2 and the marking "−" of the channels ads1 already dealt with is deleted. At the first network element NE1 the individual-channel pre-emphasis Pds2 of the drop channels ds2 is performed. No further sub-pre-emphasis settings are made.

C) For a counter COUNT=1 recovered in the third section OADM2, NE2 and of a marking for the add channels as1, as2 and express channels es1 dropped or terminated in the second network element, two individual-channel pre-emphases Pas1, Pas2 of the add channels as1, as2 with a sub-pre-emphasis settings SPes1 of the express channels es1 are performed in the second add-drop module OADM2. Markings of the add channels as1, as2 are deleted in the second add-drop module OADM2 for the further backwards transmission of the data packet. As a result of the marking of the express channels es1 at the first network element NE1 an individual-channel pre-emphasis Pest is performed for the signals of the express channels es1.

D) The counter is set to 4, thus the data packet with a counter value of 2 arrives at the second network element NE2. This initiates the ending of all pre-emphasis steps for the three sections NE1, OADM1, OADM2, NE2. The counter COUNT is set to zero and the data packet can be forwarded to a further transmission link LWL'.

For use of a second regulation protocol in a software-oriented solution the following rules can be summarized:

A network element which receives a data packet with a counter COUNT=1 in the uplink direction UL returns values of the power spectrum for an unchanged counter back to the beginning of the link and marks groups of channels which will be terminated at this network element.

A network element which receives a data packet with a counter greater than 1 in the uplink direction UL decrements the counter by 1 and forwards the data packet to the next network element.

A network element which receives a data packet in the backwards direction increments the counter by 1 and passes the data packet on to the previous network element. In this case, for all marked groups of channels which are added at this point, an individual-channel pre-emphasis is performed and the corresponding markings are deleted.

For all non-marked groups of channels or groups of channels not added at this point the average power is only equalized in the counter COUNT has the value 1.

If the counter COUNT does not have the value 1, an individual-channel pre-emphasis is only performed for groups of channels marked and added at this point. No modification of the average power per group is undertaken.

If a network element, at which all groups of channels are terminated receives a data packet in the forwards direction with the counter COUNT=2, it sends a packet with counter COUNT=0 and deactivated markings back to the previous network element.

If a network element which is not the first element of a network section—a network section here is taken to mean a part LWL, LWL' of a network which is delimited by two network elements, at which no groups of channels are looped through—receives a data packet with a counter COUNT=0 in the forwards or backwards direction, it passes it on without changing it to the previous network element.

The network element at the start of the network section increases section-by-section from pre-emphasis step to pre-emphasis step the counter COUNT by the value 1. If it receives a data packet with counter COUNT=0, the pre-emphasis for this network section is completed.

If a network element at which all groups of channels are terminated—at the end of the network section concerned LWL, receives a data packet with counter COUNT=0 in the uplink direction UL, it initiates a pre-emphasis step for the subsequent network section LWL'.

For reasons of clarity the exemplary embodiment of the invention describes two cases with four or six different groups of channels over a network section with three sections. A person skilled in the art would however implicitly be able to adapt these simplified embodiments of this method for any given number of groups of channels and sections.

The invention claimed is:

1. A method for pre-emphasis of an optical wavelength division multiplex signal of which signals with different wavelengths assembled in groups are transmitted over a channel of a transmission link with a number of sections and network elements, the channel selected from the group consisting of express channel, drop channel, add channel, and add-drop channels, the method comprising:

transmitting from a first network element to a second network element for the express channel;

injecting drop channels, add channels or add-drop channels at drop points that are arranged between the first and second network elements; and achieving predetermined average optical signal-to-noise ratios in a network element for a termination group of signals and an injection point of the group, an average and an individual-channel power setting of the signals for the termination group, wherein for a non-termination group of signals the average power is set at a preceding network element, wherein depending on a encoding type of a counter and of a marking for dropping a group, a regulation protocol provided at a selected controlling network element for control of pre-emphasis steps with sub-pre-emphasis settings and/or the additional individual-channel pre-emphasis of the groups along the transmission link is selected, and after a receipt of a data packet having the counter with a value of 0, a network element controls the pre-emphasis steps for its subsequent network sections and the counter is incremented to 1, and at the injection point, the average signal power of a group with drop channels dropped at a subsequent drop point is reduced in favor of the average signal power of an onwards-routed group of express channels, or the average signal power of a group with add-drop channels dropped at a subsequent drop point is reduced in favor of the average signal power of an onwards-routed group of express channels, or the average signal power of a group with drop channels terminated at a subsequent drop point is reduced in favor of the average signal power of an onwards-routed group of express channels, or the average signal power of a group with add-drop channels terminated at a subsequent drop point is reduced in favor of the average signal power of an onwards- routed group of express channels.

2. The method according to claim 1, further comprising redistributing via a signal power regulation of the average signal powers between the groups in injecting or switching network elements.

3. The method according to claim 1, wherein the average signal-to-noise ratios or differences between the signal-to-noise ratios of the groups of signals at corresponding termination points are determined by a network management system.

4. The method according to claim 1, wherein all channels at a corresponding point are changed individually and the average power modification of the channel group is calculated to determine the power modification.

5. The method according to claim 1, wherein for control of one of a sub-pre-emphasis settings, a network element is activated with the aid of a data packet which is transmitted outwards and backwards from a first injection point to the other network element section-by-section and which contains a marking of the injection and termination points of each of the groups of signals.

6. The method according to claim 5, wherein at a network element the data packet is used for control of one of the additional individual-channel pre-emphases of one of the groups of signals.

7. The method according to claim 6, wherein for control of a transmission direction and a data packet range between the network elements a counter in the data packet is initialized, or incremented or decremented.

8. The method according to claim 1, wherein after a receipt of a data packet having the counter with a value of 1 at a network element, a spectrum of the signals as well as the data packet from a network element are sent back along the transmission link and that on the backwards journey of the data packet through each network element without termination point, for the groups of the channels there the counter is incremented by 1.

9. The method according to claim 8, wherein for an unchanged counter the data packet is transmitted in an opposite direction.

10. The method according to claim 1, wherein at a network elements with a termination of a group of channels, a marking is activated in the transmitted packet for the group and the marking for the group is deleted at the injection point of the same group on return of the data packet.

11. The method according to claim 1, wherein after a receipt of a data packet having the counter at a value higher than 1 at a network element, the counter is decremented by 1 and the decremented counter transmitted forward towards a next network element or the counter is decremented by 1 and the decremented counter is transmitted backward towards a previous network element or the counter is increment by 1 and the incremented counter is transmitted backward towards a previous network element, which is a controlling network element, and after a receipt of the backwards data packet by the controlling network element the counter remains unchanged.

12. The method according to claim 1, wherein after a receipt of a backwards data packet at the controlling network element, the counter remains unchanged or the counter is set to 0 and the network element having sent the backwards data packet is a new controlling network element for control of further pre-emphasis steps.

13. The method according to claim 1, wherein the pre-emphasis steps are controlled at different selected controlling network elements during the transmission of the data packet within the transmission link.

14. The method according to claim 13, wherein a network element which receives a data packet with a counter having a value of 1 in an uplink direction, returns values of the power spectrum for an unchanged counter to the beginning of the transmission link and marks groups of channels which are terminated at this network element.

15. The method according to claim 13, wherein a network element which receives a data packet with the counter having a value greater than 1 in the uplink directions, decrements the counter by 1 and transmits the data packet with the decremented counter to the next network element.

16. The method according to claim 13, wherein a network element which receives a data packet with the counter having a value greater than 1 in the backwards directions, increments the counter by 1 and transmits the data packet with the incremented counter to the preceding network element.

17. The method according to claim 16, wherein for all marked groups of channels which are inserted at the network element, an individual-channel pre-emphasis is executed an their corresponding markings are deleted.

18. The method according to claim 17, wherein for all non-marked groups of channels or groups of channels not inserted at the network element an equalization of the average power is used if the counter has the value 1.

19. The method according to claim 15, wherein if the value of the counter is not 1, an individual channel pre-emphasis for groups of channels marked and inserted at the network is preformed.

20. The method according to claim 19, wherein the average power per group remains constant.

21. The method according to claim 15, wherein a network element, at which all groups of channels are terminated and which receives a data packet in the uplink direction with a counter with a value of 2, transmits a data packet with a counter value of 0 and deactivates at the preceding network element.

22. The method according to claim 15, wherein a after receiving data packet with a counter by a network element, the data packet is transmitted unchanged or the counter is incremented by 1 and the data packet with the incremented counter is transmitted.

* * * * *

UNITED STATES PATENT AND TRADEMARK OFFICE
CERTIFICATE OF CORRECTION

PATENT NO. : 7,627,248 B2
APPLICATION NO. : 10/562304
DATED : December 1, 2009
INVENTOR(S) : Peisl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 910 days.

Signed and Sealed this

Second Day of November, 2010

David J. Kappos
*Director of the United States Patent and Trademark Office*